United States Patent [19]

Annestedt

[11] Patent Number: 5,468,026
[45] Date of Patent: Nov. 21, 1995

[54] SPACER CLIP FOR CHIMNEY

[75] Inventor: James W. Annestedt, Memphis, Tenn.

[73] Assignee: American Metal Products Company, Los Angeles, Calif.

[21] Appl. No.: 101,208

[22] Filed: Aug. 3, 1993

[51] Int. Cl.⁶ .............................. F16L 39/00; F16L 9/18
[52] U.S. Cl. ........................ 285/133.1; 138/148; 454/44
[58] Field of Search ........................ 285/133.1; 138/148, 138/114; 454/44, 47

[56] References Cited

U.S. PATENT DOCUMENTS

| | | |
|---|---|---|
| 360,782 | 4/1887 | Ober. |
| 1,067,172 | 7/1913 | Holub ........................... 138/148 |
| 1,158,855 | 11/1915 | Robinson ........................ 138/114 |
| 1,593,256 | 7/1926 | Harms ........................... 138/148 |
| 1,824,422 | 9/1931 | Badger. |
| 2,275,902 | 3/1942 | Hasenburger ..................... 138/114 |
| 2,362,557 | 11/1944 | Jahns. |
| 2,451,587 | 10/1948 | Taylor. |
| 2,679,867 | 6/1954 | Epstein. |
| 2,761,949 | 9/1956 | Colton. |
| 2,795,108 | 6/1957 | Saldin .......................... 138/148 |
| 2,850,264 | 9/1958 | Grable. |
| 2,894,537 | 7/1959 | Carr. |
| 2,898,839 | 8/1959 | McKann ......................... 454/44 |
| 2,930,407 | 3/1960 | Conley et al.. |
| 2,962,053 | 11/1960 | Epstein ......................... 138/148 |
| 3,146,005 | 8/1964 | Peyton. |
| 3,170,544 | 2/1965 | Kinkead et al.. |
| 3,208,539 | 9/1965 | Henderson. |
| 3,226,135 | 12/1965 | Epstein. |
| 3,427,051 | 2/1969 | White et al.. |
| 3,544,135 | 12/1970 | Hoerrner. |
| 3,574,357 | 4/1971 | Alexandru et al.. |
| 3,583,730 | 6/1971 | Kozlowski. |
| 3,648,734 | 3/1972 | Waite et al. ..................... 138/114 |
| 3,785,407 | 1/1974 | Waite et al. ..................... 138/148 |
| 3,889,715 | 6/1975 | Lilja et al.. |
| 3,902,744 | 9/1975 | Stone. |
| 4,029,343 | 6/1977 | Stone. |
| 4,432,485 | 2/1984 | Smith. |
| 4,607,665 | 8/1986 | Williams ........................ 138/148 |
| 4,720,125 | 1/1988 | Ream et al.. |
| 4,724,750 | 2/1988 | Coleman et al. .................. 138/148 |
| 4,781,402 | 11/1988 | Ream et al.. |
| 4,929,000 | 5/1990 | Annestedt. |

FOREIGN PATENT DOCUMENTS

| | | |
|---|---|---|
| 679434 | 2/1964 | Canada. |
| 23222415 | 11/1974 | Germany. |
| 2844223 | 4/1980 | Germany. |

Primary Examiner—Eric K. Nicholson
Attorney, Agent, or Firm—Edgar A. Zarins; Malcolm L. Sutherland

[57] ABSTRACT

A spacer clip for maintaining the coaxial spacing of the walls in a multiple wall chimney. A plurality of spacer clips are circumferentially positioned within the annulus between the walls. The clip attaches to the outer wall and includes a biasing arm which engages the inner wall to maintain the spacing between the walls. The biasing arm of the clips may be retracted to facilitate insertion or removal of the inner wall from within the outer wall.

11 Claims, 1 Drawing Sheet

SPACER CLIP FOR CHIMNEY

BACKGROUND OF THE INVENTION

1. Field of the Invention

This invention relates to multiple walled chimney stacks which include an insulating annulus to retard the conduction of heat and, in particular, to an economical spacer clip utilized to maintain the annulus between the walls while minimizing the conduction of heat.

2. Description of the Prior Art

Double-walled metal chimneys have been widely used in place of masonry chimneys because of their versatility particularly in joining chimney sections to form the desired chimney length. The double wall reduces heat conduction to the exterior of the chimney permitting the chimney to be mounted without the threat of combustion of supporting materials. The double wall also ensures that smoke and gases are vented through the chimney even if some leakage occurs through the inner wall. Spacer members are mounted between the walls so as to minimize heat conduction from the inner wall to the outer wall while also not blocking the annulus therebetween to allow the flow of gases upwardly through the annulus.

The chimney sections are normally constructed by positioning he spacer elements between the wall segments and securing the elements to the inner and outer walls. The spacers may be spot welded, riveted, or bolted to the wall segments. However, the secured spacer elements do not provide any leeway for expansion and contraction during operations. Moreover, attachment of the individual spacer elements raises the cost of production.

As a substitute for the individual spacer elements, spacer rings have been developed for insertion between the walls of the chimney sections. Such spacer rings may be an annular ring with spacer elements attached thereto or cut and bent out of the ring itself during assembly, the ring is secured between the wall sections in much the same manner as the individual elements. Although simplifying manufacture by incorporating the spacer members into a ring for simultaneous insertion, manufacturing costs are not substantially reduced since the spacer ring must still be secured between the walls to prevent longitudinal shifting.

Corrugated or sinusoidal spacer bands have also been developed to maintain the spacing between wall sections. Typically, these spacers are formed of a continuous band having its ends joined to form a ring. The corrugated spacer ring is thereafter secured between the walls by spot welding the peaks of the spacer to the wall which they contact. The corrugated spacer band is well suited for multiple walled chimneys where air flow between the walls is desired. In insulated chimneys the configuration of the bands creates a void of insulation. Although simplifying positioning, manufacturing costs are not substantially reduced since the ring must be secured to the wall sections. The ring also does not allow for expansion and contraction in relation to the wall sections. However, the strength of the corrugated spacer ring is greater than the other spacer means thereby providing structural strength to the double-walled chimney.

The prior known spacer elements complicate the assembly of the multiple walls chimneys by requiring specialized fasteners or welding. In most cases, disassembly is not possible because of the permanent nature of the assembly. What is desired is a simple spacer element which is economical to manufacture while also facilitating assembly of the chimney stack or disassembly, if necessary.

SUMMARY OF THE PRESENT INVENTION

The present invention overcomes the disadvantes of prior known spacer elements by providing an economical spacer clip which readily attaches to the stack members yet provides for simple assembly of multiple walled chimneys The spacer clip of the present invention maintain the annulus spacing between the walls of a multiple-walled chimney while facilitating assembly and interchanging of chimney compenents. The clip biases the walls apart maintaining the annulus therebetween. Although engaging both walls, the clip may be detached and easily removed. Conversely, the spacer clip facilitates assembly of the chimney stack. In a preferred embodiment the clip is mounted to the outer wall and includes a biasing arm which engages the inner wall to maintain spacing. Typically, a flange or lip on the inner wall in engagement with the biasing arm prevents relative longitudinal movement of the wall members.

In insulated chimneys, the flat configuration of the spacer clips allows full use of insulation by abutting the insulation ends right up to the clips. Additionally, various insulation thicknesses can be accomodated between the walls simply by changing the length of the clip.

Other objects, features and advantages of the invention will be apparent from the following detailed description taken in connection with the accompanying drawings.

BRIEF DESCRIPTION OF THE DRAWING

The present invention will be more fully understood by reference to the following detailed description of a preferred embodiment of the present invention when read in conjunction with the accompanying drawing, in which like reference characters refer to like parts throughout the views and in which.

DETAILED DESCRIPTION OF A PREFERRED EMBODIMENT OF THE PRESENT INVENTION

Figure 1:
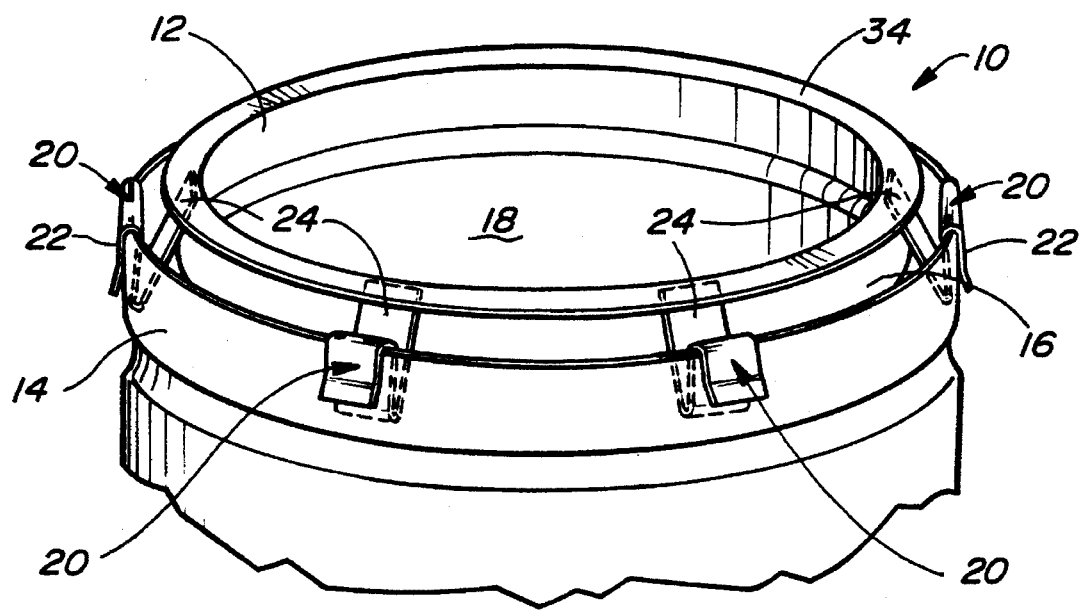
FIG. 1 is a perspective view of a section of chimney embodying the spacer clip of the present invention.
Figure 2:
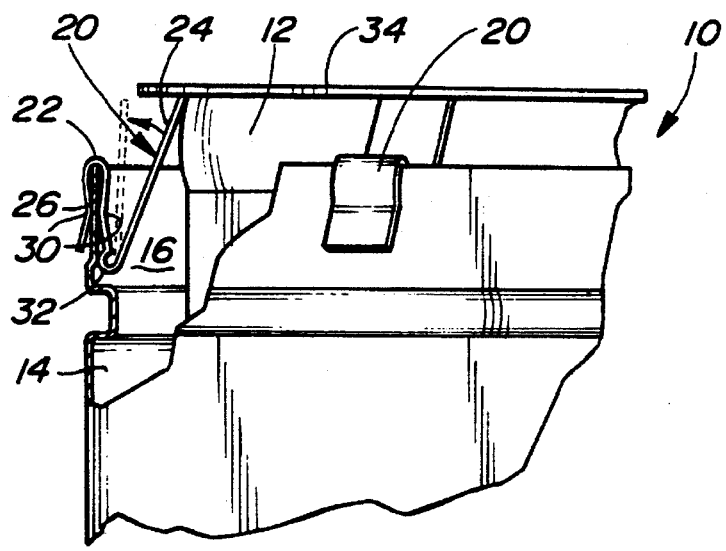
FIG. 2 is an enlarged perspective of the spacer clip mounted within the multiple wall chimney.
Figure 3:
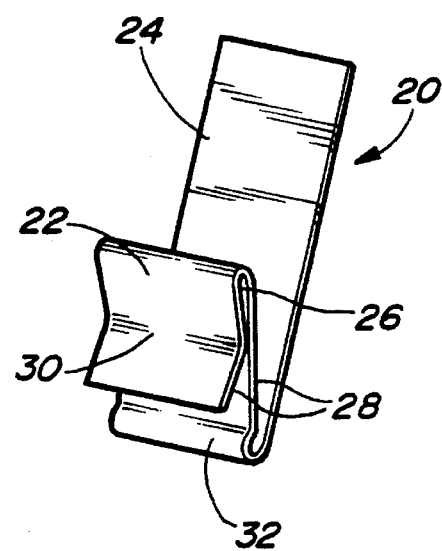
FIG. 3 is an elevated perspective of the spacer clip.

Referring to FIG. 1 through 3, there is shown a section of multiple walled chimney 10 comprising an inner wall 12 and an outer wall 14 forming an annulus 16 therebetween. The chimney section 10 is intended to be connected to similar chimney section 10 to form a chimney stack suitable for mounting within a wallform. Typically, the chimney section 10 are axially connected using a first clamp member to connect the inner walls 12 and a second clamp member to connect the outer walls 14. Once connected, the chimney section 10 form a continuous central passageway 18 to carry the fumes and a continuous annulus 16 which insulates the outer wall 14 from the conductive beat of the inner wall 12 while directing any leakage from the main passage 18 up the stack.

In order to maintain proper spacing between the inner wall 12 and the outer wall 14 while ensuring the free flow of gasses through the annulus 16, a spacer clip 20 is provided between the walls. In a preferred embodiment, the spacer clip 20 is mounted t the outer wall 14 and biasingly engages the inner wall 12 to maintain spacing therebetween. However, in certain construction, the clip 20 may be mounted to the inner wall 12 to maintain spacing therebetween. However, in certain constructions, the clip 28 may be mounted to the inner wall 12 engaging the outer wall 14. The spring clip 20 has a one-piece, integral band construction and includes a clip member 22 which maintains the spring clip 20 on the outer wall 14 and a biasing arm 24 extending from the clip member 22. The clip member 22 preferably has a corrugated shape forming a slot 26 designed to slip over the end of the outer wall 14 as best shown in FIG. 2. The cooperating band segments 28 which form the clip member 22 preferably pinch together along fold 30 to ensure secure engagement with the wall 14. A bead 32 at the juncture of the clip member 22 and biasing arm 24 also assists in maintaining the spacer clip 20 on the outer wall 14. In addition, the bead 32 biases the arm 24 outwardly away from the clip member 22 for selective engagement with a wall of the chimney 10. The biasing arm 24 is designed to maintain the desired spacing between the wall 12 and 14.

During assembly of the chimney sections 10, a plurality of spacer clips 20 are mounted to the outer wall 14 by sliding the clip member 22 over the end of the wall 14 such that the wall 14 is disposed within slot 26. The spacer clips 20 are circumferentially spaced along the wall 14. Thereafter, the inner wall 12 can be inserted within the outer wall 14. The biasing arm 24 of the clips 20 engage the inner wall 12 and in consortium bias the wall 12 inwardly to maintain a uniform spacing therebetween. The biasing arm 24 of the clip 20 is positioned beneath a flange or lip 34 of the inner wall 12 to prevent relative longitudinal movement. Since each chimney section 10 includes a set of spacer clips 20 of each of its ends, the biasing arm 24 acting against the flange 34 will prevent any longitudinal movement of the walls relative to each other. Thus, the spring clip 20 of the present invention, when mounted between the walls 12 and 14, provide an economical means of maintaining proper spacing of the annulus 16. In insulated chimneys, the flat configuration of the spacer clips allows full use of insulation by abutting the insulation ends right up to the clips. Additionally, various insulation thicknesses can be accomodated between the walls simply by changing the length of the clip. The detachable nature of the spring clip 20 facilitates assembly and, if necessary, disassembly of the chimney section 10.

The foregoing detailed description has been given for clearness of understanding only and no unnecessary limitations should be understood therefrom as some modifications will be obvious to those skilled in the art without departing from the scope and spirit of the appended claims.

What is claimed is:

1. In a double-walled chimney formed by joining double-walled chimney sections in adjourning axial alignment, each of said chimney sections having an inner wall and an outer wall in concentive spaced apart relationship, the outer wall having a diameter greater than the inner wall to form an annulus therebetween, the improvement comprising:

a plurality of spacer clip circumferentially positioned on said outer wall to maintain the concentric spaced apart relationship of the walls, said spacer clip mounted to said outer wall and including an integral biasing arm engaging said inner wall, said outer wall received within a clip member integral with said biasing arm, said clip member forming a slot receiving said outer wall for detachably mounting said spring clip thereto.

2. The improvement as defined in claim 1 wherein said clip member is formed by a continuous corrugated band having a pinch fold for securing said outer wall within said slot of said clip member.

3. The improvement as defined in claim 2 wherein said biasing arm is connected to said clip member by an integral bead, said bead biasing said arm away from said clip member while frictionally engaging said outer wall disposed within said clip member.

4. A double-walled chimney section for forming a chimney stack, said chimney section adapted to be joined with a similar chimney section, said chimney section comprising:

an inner wall member and an outer wall member in concentric spaced-apart relationship, said outer wall member having a diameter greater than said inner wall member to form an annulus between said wall members, said inner well member including an end flange; and a plurality of spacer clips circumferentially positioned within said annulus to maintain the concentric spaced apart relationship of said inner and outer wall members;

said spacer clips including a clip member and an integral biasing arm, said clip member having integral cooperating bands forming a slot therebetween, said clip member receiving said outer wall within said slot and said arm biasingly engaging said inner wall proximate said end flange thereby preventing longitudinal movement of said inner wall member relative to said outer wall member while maintaining the concentric spaced apart relationship of said inner and outer wall members.

5. The chimney section as defined in claim 4 wherein said cooperating bands of said clip member include a pinch fold for maintaining engagement with said outer wall member.

6. The chimney section as defined in claim 5 wherein said spacer clip includes a bead connecting said biasing arm to said clip member, said bead biasing said arm way from said clip member.

7. The chimney section as defined in claim 4 wherein said chimney section includes a plurality of spacer clips at each end thereof, said biasing arms engaging end flanges at each end of said inner wall member to prevent relative longitudinal movement, said arms being withdrawn from engagement with said end flanges for separation of said inner wall member from within said outer wall member.

8. In a multiple walled chimney formed by joining multiple walled chimney sections in adjoining axial alignment, each of said multiple walled chimney sections having at least two wall members in concentric spaced apart relationship, the outer wall having a diameter greater than the inner wall to form an annulus therebetween, the improvement comprising:

a plurality of spacer clips mounted between the wall members to maintain the concentric spaced apart relationship of the wall members, said spacer clips mounted on the outer wall of said chimney section and including an integral biasing arm and clip member, said clip member having a slot receiving said outer wall for detachably mounting said spring clip to said outer wall and said biasing arm engaging an inner wall whereby said spacer clips biasingly maintain the concentric spaced apart relationship of said inner and outer walls.

9. The improvement as defined in claim 8 wherein said inner wall includes an end flange, said biasing arm engaging said end flange of said inner wall preventing longitudinal movement of said inner wall relative to said outer wall.

10. The improvement as defined in claim 9 wherein said clip member includes a continuous corrugated band forming said slot therebetween, said clip member having a pinch fold for securing said outer wall member within said clip member.

11. The improvement as defined in claim 9 wherein said biasing arm includes a transverse bead, said bead joining said biasing arm to said clip member.

* * * * *